No. 707,055. Patented Aug. 12, 1902.
C. M. EARL.
CABLE SLEEVE.
(Application filed Dec. 6, 1901.)
(No Model.)

WITNESSES.
O. B. Barnziger
E. C. Davis

INVENTOR.
Charles M. Earl
By R. G. Wheeler
Attorneys.

THE NORRIS PETERS CO., PHOTO-LITHO., WASHINGTON, D. C.

UNITED STATES PATENT OFFICE.

CHARLES M. EARL, OF DETROIT, MICHIGAN, ASSIGNOR OF TWO-THIRDS TO WILLIAM J. STAPLETON AND EDWARD McBRIDE, OF DETROIT, MICHIGAN.

CABLE-SLEEVE.

SPECIFICATION forming part of Letters Patent No. 707,055, dated August 12, 1902.

Application filed December 6, 1901. Serial No. 84,896. (No model.)

*To all whom it may concern:*

Be it known that I, CHARLES M. EARL, a citizen of the United States, residing at Detroit, in the county of Wayne, State of Michigan, have invented certain new and useful Improvements in Cable-Sleeves; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a cable-sleeve especially designed for covering the splice or joint in an electric cable; and it consists in the construction and arrangement of parts hereinafter fully set forth, and pointed out particularly in the claims.

The object of the invention is to provide a sleeve of the character described in which the arrangement is such as to enable it to be readily placed upon a cable, so as to cover the splice or joint therein in a manner to afford ready access to said joint and at the same time protect said joint or splice from moisture.

The above object is attained by the device illustrated in the accompanying drawings, in which—

Figure 1:
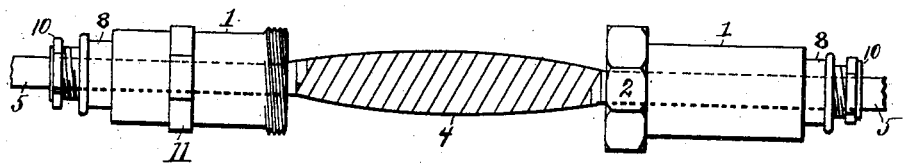
Figure 2:
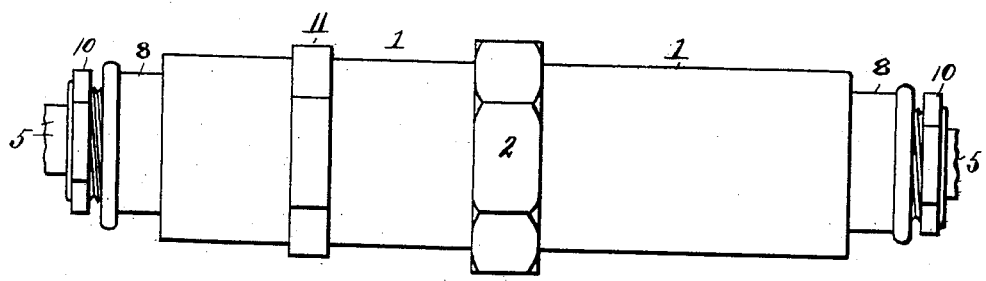
Figure 3:
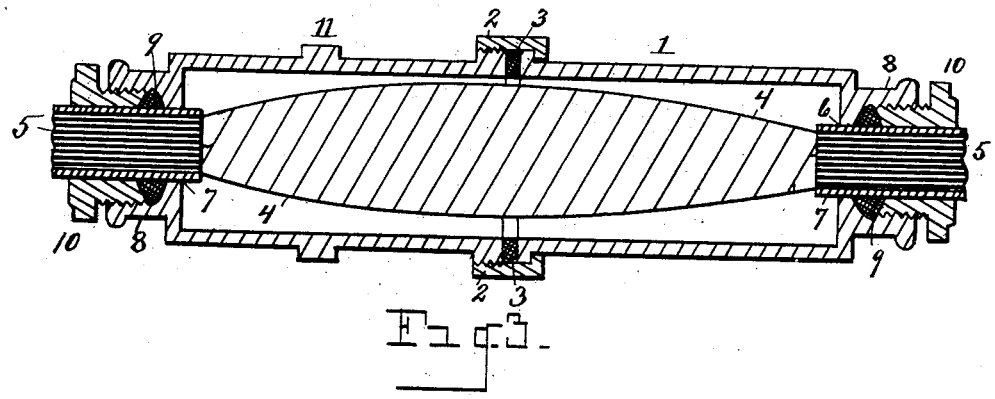

Figure 1 is an elevation showing the sleeve upon a cable with the parts of the sleeve separated and shoved back upon the cable to expose the splice or joint. Fig. 2 is an enlarged elevation of the sleeve in position upon the cable to embrace and protect said splice. Fig. 3 is the longitudinal section through the sleeve and cable with the parts in position as shown in Fig. 2.

In laying of underground or aerial cables containing a number of insulated electrical wires or conductors said cables must be laid or strung in sections, and the meeting ends of said sections must be spliced or joined, so as to effect an electrical continuity of the conductors of which the cable is composed. The usual method of protecting the splice is to place thereover a lead sleeve, which is secured at its opposite ends to the lead casing of the cable by means of a wiped joint. Should the splicing prove defective or should access thereto be found necessary, the wiped joint must be fused to allow the sleeve to be removed, which operation often results in the destruction of the cable. I overcome these objections and difficulties by the sleeve illustrated in the drawings forming a part of this specification, with reference to which—

1 designates the sleeve, composed of two sections adapted to be united by a union-coupling 2, which compresses between the meeting ends of the sleeve-sections a suitable washer 3. The inner diameter of the sleeve throughout the main portion thereof is sufficient to freely embrace the enlarged splice 4 of the cable 5. The opposite ends of the sleeve are provided with a reduced opening 6, adapted to receive the lead casing 7 of the joined ends of the cable. Surrounding the reduced opening through the opposite ends of the sleeve are the stuffing-boxes 8, in which are confined the compressible washers 9, provided with a round central opening through which the cable passes. Adapted to screw into the stuffing-boxes at the opposite ends of the sleeve are the glands 10, which embrace the casing of the cable and when screwed into the stuffing-boxes compress the washers 9, so as to force them tightly against the casing of the cable and form a joint which prevents the entrance of water into the sleeve.

In attaching this improved sleeve to a cable the opposite divisions thereof are slipped onto the opposite ends of the cable to be spliced. When the ends of the electrical conductors of the cable-sections have been joined and wound, the sections of the sleeve are brought together over the splice and securely united by the union-coupling, after which the glands 10 at the ends are screwed into their respective stuffing-boxes to compress the washers 9 around the casing of the cable, thereby mounting the sleeve upon the cable in a manner to perfectly exclude water from the spliced joint and at the same time afford ready access to the joint when desired. In removing the sleeve, so as to expose the joint, the glands 10 are screwed out of their stuffing-boxes, so as to relieve the pressure of the washers 10 upon the casing of the cable. The union-coupling at the center of the sleeve is then unscrewed, when the divided sections of the sleeve may be shoved back upon the cable, so as to expose the joint, as clearly shown in Fig. 1.

The sleeve will be formed, preferably, of some durable metal, and where it is employed in covering the splice in aerial cables it is preferably made of aluminium, owing to its lightness and non-corrosive nature.

Upon one section of the sleeve is an octagonal flange 11, which provides for the application of a wrench for the purpose of holding the sleeve to disengage its members after the threads of the union-joint have become set.

Having thus fully set forth my invention, what I claim as new, and desire to secure by Letters Patent, is—

1. In a cable-sleeve the combination of the separable members, means for uniting said members of the sleeve to form a water-tight joint, the ends of the sleeve having reduced apertures through which the cable runs, and means for closing said apertures around the casing of the cable to prevent the entrance of water to the interior of the sleeve.

2. In a cable-sleeve the combination of the separable sleeve members forming, when united, an inclosed chamber adapted to embrace the splice of a cable, means for joining the members of the sleeve in a manner to exclude water from said joint, the ends of the sleeve having reduced apertures communicating with said chamber, through which the cable is adapted to run, compressible washers surrounding the casing of the cable within said apertures, and the glands surrounding the cables adapted to screw into said apertures to compress said washers therein.

3. In a cable the combination of the separable members adapted to be united by a union-joint whereby they are detachably connected, the ends of the sleeve having reduced apertures through which the cable is adapted to run, stuffing-boxes around said apertures, compressible washers embracing the cable within said stuffing-boxes, the normal diameter of said washers being such as to enable them to slide freely over the cable, and the glands surrounding the cable screwing into said stuffing-boxes against said compressible washers.

In testimony whereof I sign this specification in the presence of two witnesses.

CHARLES M. EARL.

Witnesses:
EDWARD McBRIDE,
E. S. WHEELER.